UNITED STATES PATENT OFFICE.

FRITZ HOFMANN, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING DIOLEFINE HYDROCARBONS.

1,048,967. Specification of Letters Patent. Patented Dec. 31, 1912.

No Drawing. Application filed May 6, 1912. Serial No. 695,523.

*To all whom it may concern:*

Be it known that we, FRITZ HOFMANN, KONRAD DELBRÜCK, and KURT MEISENBURG, doctors of philosophy, chemists, citizens of the German Empire, residing at Elberfeld, Germany, have invented new and useful Improvements in Processes of Producing Diolefine Hydrocarbons, of which the following is a specification.

Our invention concerns a new and valuable process which results in an excellent yield of a diolefine hydrocarbon and more specifically of beta-gamma-dimethylerythrene and which consists in heating a pinacone, and more specifically the dihydric alcohol known itself as pinacone, with a neutral salt of a sulfonic acid which salt has an acid reaction.

The process proceeds according to the following equation:

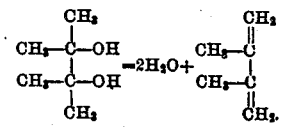

In order to illustrate the new process more fully the following example is given, the parts being by weight:—1000 parts of pinacone are mixed with 1 part of the anilin salt of naphthalene-monosulfonic acid and the resulting mixture is heated to 130–140° C. Dimethylerythrene and water distil over besides pinacone hydrate and small quantities of pinacolin. The beta-gamma-dimethylerythrene isolated from the mixture boils at 68 to 69° C. Other of the above mentioned salts may be used *e. g.* the diphenylamin salt of naphthalene-1.5-disulfonic acid etc.

We claim:

1. The process of producing beta-gamma-dimethylerythrene, which comprises first distilling pinacone with a neutral salt of a sulfonic acid which salt has an acid reaction and then separating the beta-gamma-dimethylerythrene, substantially as described.

2. The process of producing beta-gamma-dimethylerythrene, which comprises first distilling pinacone with the anilin salt of naphthalene-monosulfonic acid and then separating the beta-gamma-dimethylerythrene, substantially as described.

3. The process of producing beta-gamma-dimethylerythrene which comprises distilling pinacone with a neutral salt of a sulfonic acid which salt has an acid reaction.

4. The process of producing beta-gamma-dimethylerythrene which comprises distilling pinacone with an anilin salt of an aromatic sulfonic acid.

5. The process of producing beta-gamma-dimethylerythrene which comprises distilling pinacone with an anilin salt of a naphthalene sulfonic acid.

6. The process of producing beta-gamma-dimethylerythrene which comprises distilling pinacone with the anilin salt of naphthalene monosulfonic acid.

7. The process of producing beta-gamma-dimethylerythrene which comprises distilling pinacone with a neutral organic salt of a sulfonic acid which salt has an acid reaction.

8. The process of producing a diolefine hydrocarbon which comprises distilling a pinacone with a neutral salt of a sulfonic acid which salt has an acid reaction.

9. The process of producing a diolefine hydrocarbon which comprises distilling a pinacone with the anilin salt of naphthalene monosulfonic acid.

In testimony whereof we have hereunto set our hands in the presence of two subscribing witnesses.

FRITZ HOFMANN. [L. S.]
KONRAD DELBRÜCK. [L. S.]
KURT MEISENBURG. [L. S.]

Witnesses:
HELEN NUFER,
ALBERT NUFER.